United States Patent [19]

McIlnay-Moe

[11] Patent Number: 5,622,140
[45] Date of Patent: Apr. 22, 1997

[54] PET LITTER BOX AND SCREENING APPARATUS

[76] Inventor: Dennis McIlnay-Moe, 1235 Riebli Rd., Santa Rosa, Calif. 95404

[21] Appl. No.: 517,476

[22] Filed: Aug. 21, 1995

[51] Int. Cl.⁶ ............................................. A01K 1/035
[52] U.S. Cl. ..................................................... 119/166
[58] Field of Search ........................... 119/163, 166, 119/167

[56] References Cited

U.S. PATENT DOCUMENTS

| | | | |
|---|---|---|---|
| 4,120,264 | 10/1978 | Carter | 119/166 |
| 4,493,288 | 1/1985 | Van Der Kolk | 119/166 X |
| 4,574,735 | 3/1986 | Hohenstein | 119/166 X |
| 4,846,104 | 7/1989 | Pierson, Jr. | 119/166 |

*Primary Examiner*—Robert P. Swiatek
*Assistant Examiner*—Elizabeth Shaw
*Attorney, Agent, or Firm*—Larry D. Johnson

[57] ABSTRACT

A pet litter box apparatus includes an outer enclosure having a front opening for access by a cat or other animal, with an inner carrier providing a litter accumulation area and including a radially-extending screen, rotationally mounted within the outer enclosure on a carrier support at a hub. A waste storage container with a normally closed access port is positioned below the hub. For cleaning, the carrier is rotated about the hub on its axis of rotation to move the screen through the litter accumulation area to collect any agglomerated litter and fecal material. This waste is carried by the screen in the rotating carrier to a point above the hub, where a shield on the hub normally covering the access port for the waste storage container has now rotated to expose the access port and enable the agglomerated litter and fecal material to fall into the waste storage container.

5 Claims, 3 Drawing Sheets

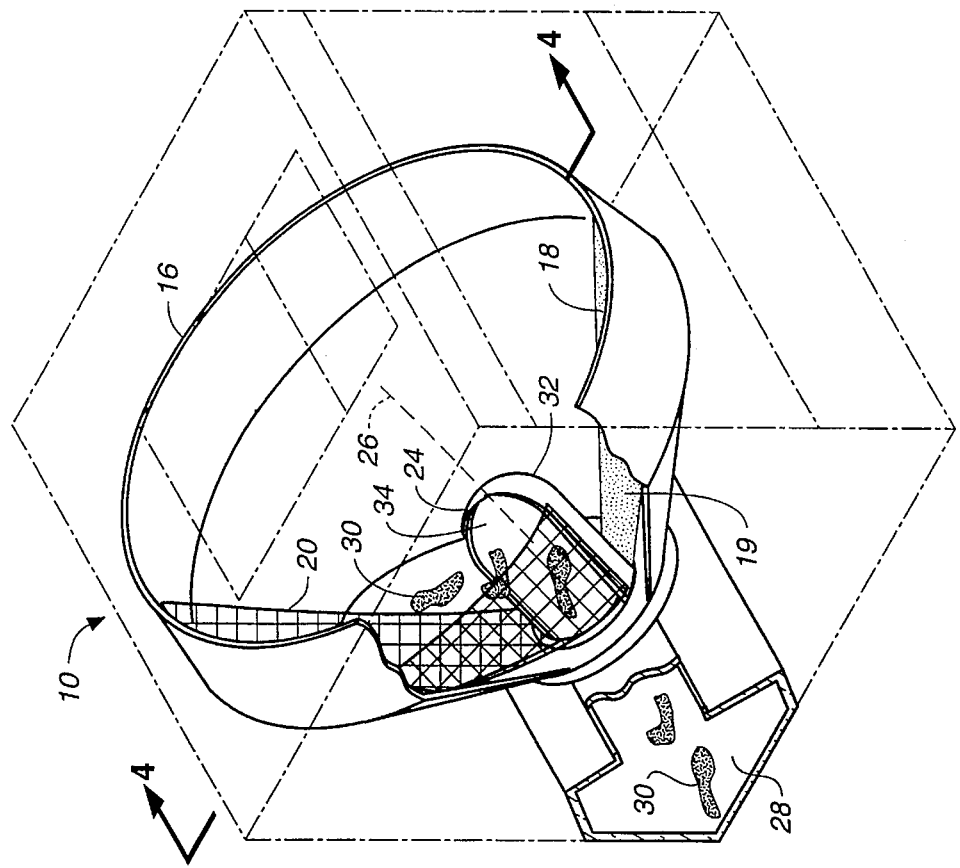
FIG._1A
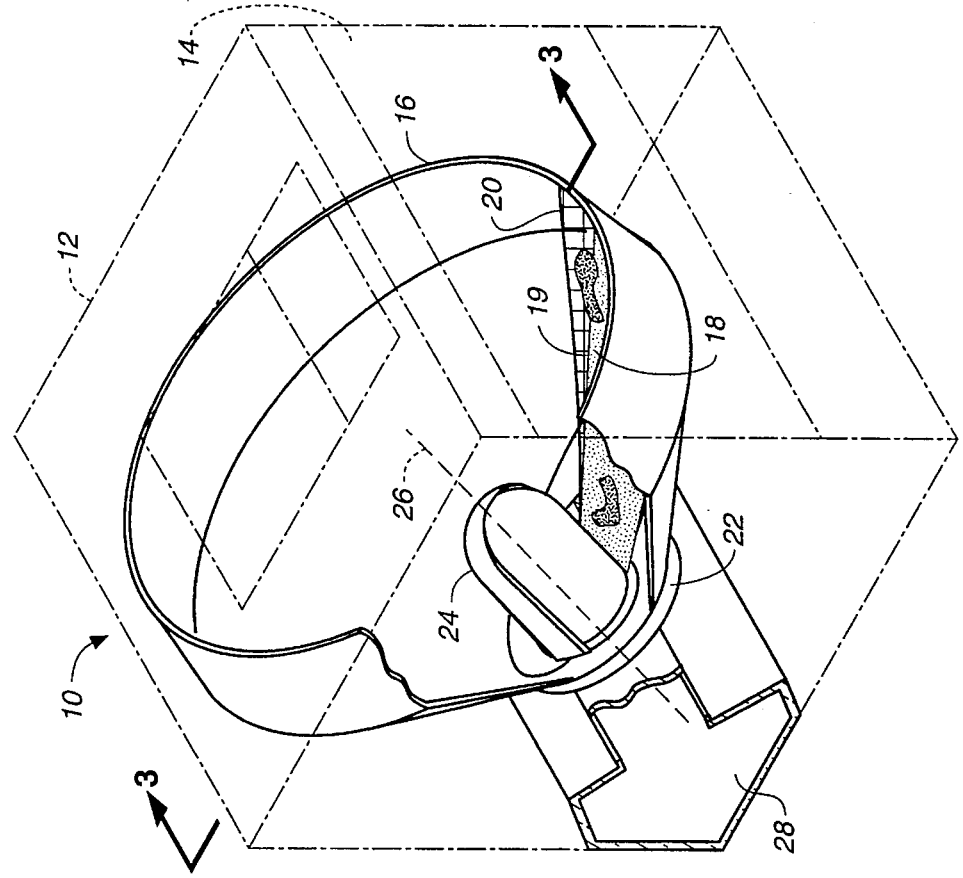
FIG._1

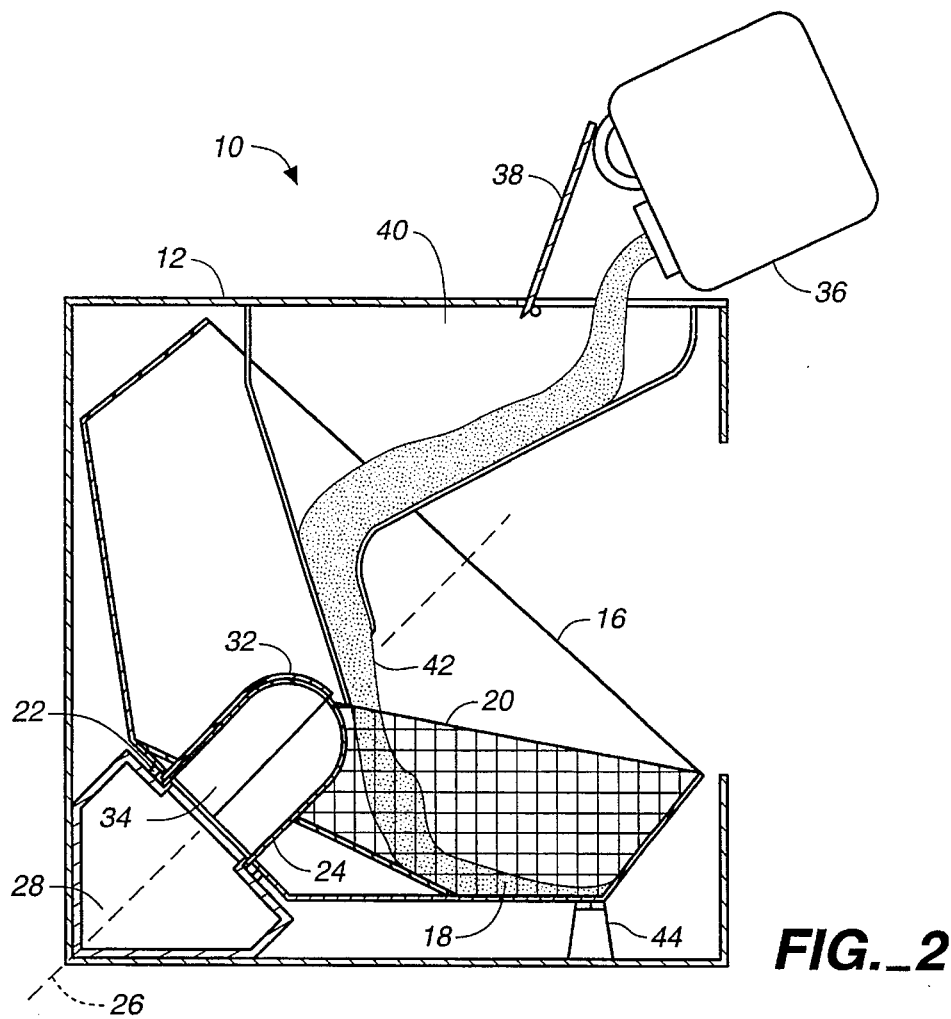
FIG._2
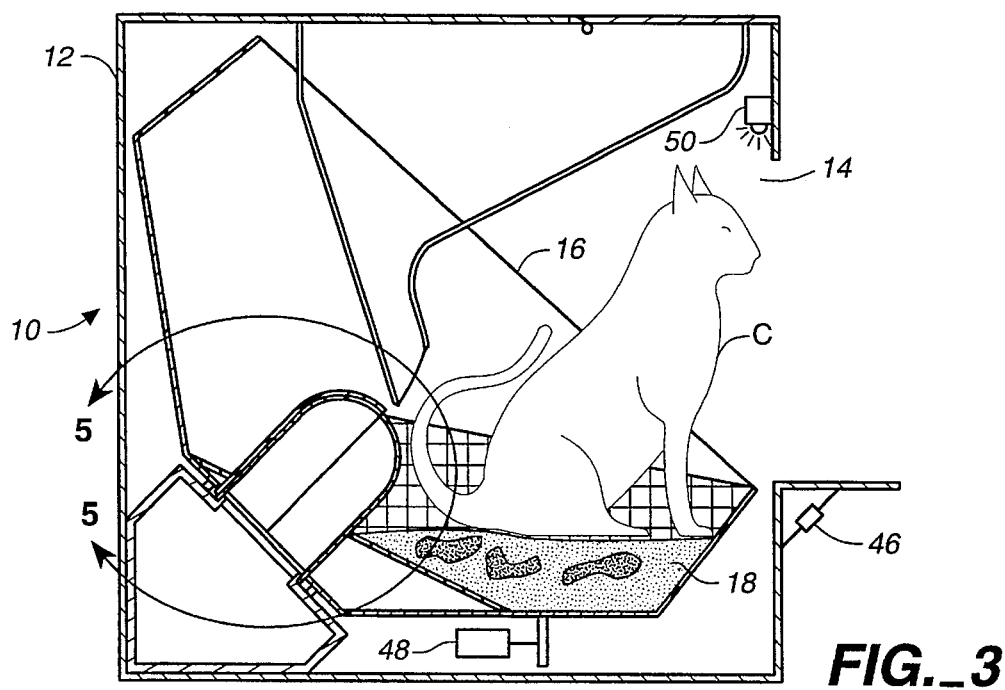
FIG._3

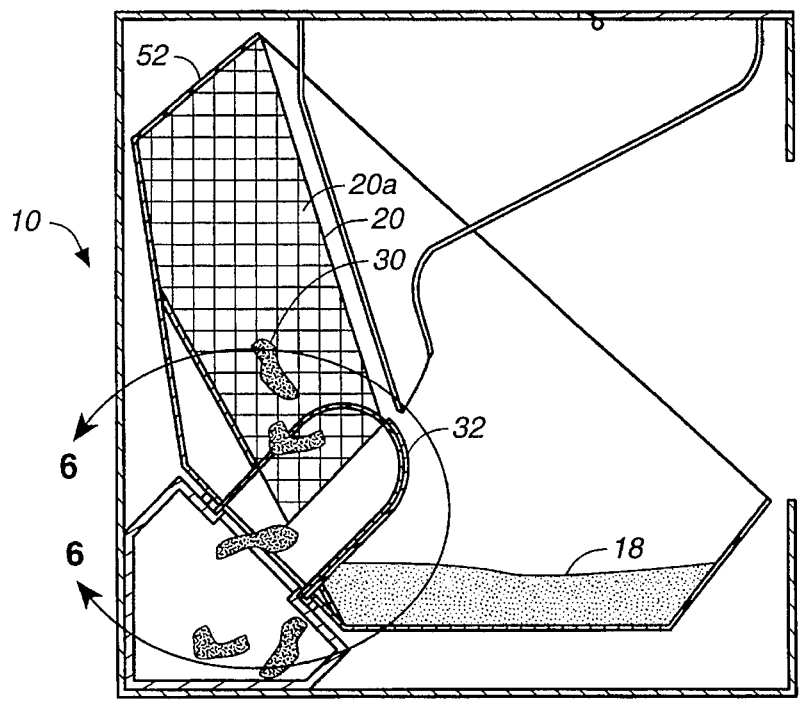
FIG._4
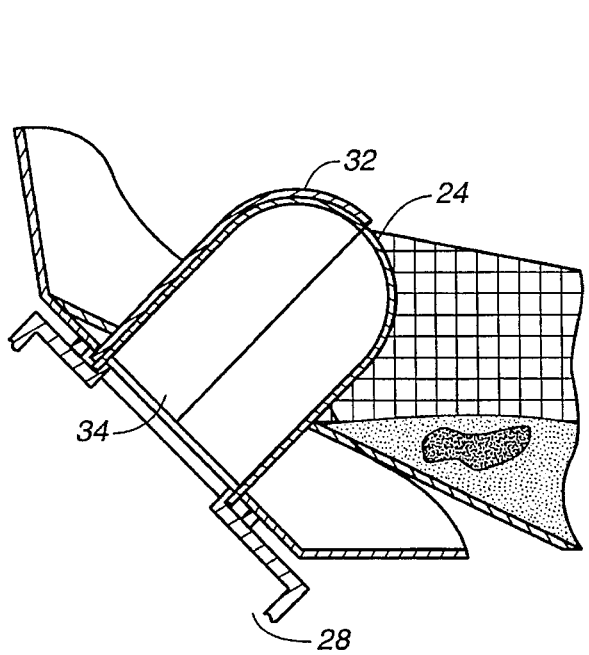
FIG._5
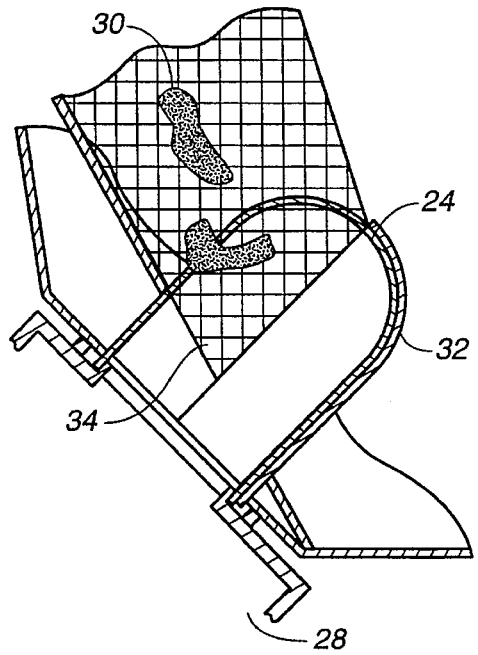
FIG._6

5,622,140

PET LITTER BOX AND SCREENING APPARATUS

BACKGROUND OF THE INVENTION

1. Field of the Invention

This invention relates generally to pet supplies and associated hardware, and more specifically to an improved pet litter box apparatus having litter screening and waste storage capabilities.

2. Description of the Prior Art

Pet litter boxes are well known and in widespread use. Typically, litter boxes simply consist of an open tray into which a quantity of litter material is placed, enabling the cat or other pet to access the litter box at will. However, this arrangement requires frequent cleaning of and/or disposal of the contaminated litter, which can be a time consuming and unpleasant task.

SUMMARY OF THE INVENTION

The pet litter box and screening apparatus of this invention provides an improved pet litter box apparatus having litter screening and waste storage capabilities. The inventive apparatus includes an outer housing or enclosure portion having a large front opening for ingress and egress by a cat or other animal, with an inner carrier portion providing a litter accumulation area and including a radially-extending screen, rotationally mounted within the outer enclosure on a carrier support at a carrier hub. A waste storage container with a normally closed access port is positioned below the carrier hub. For cleaning, the carrier portion is rotated about the carrier hub on its axis of rotation to move the screen through the litter accumulation area to collect any agglomerated litter and fecal material. This waste material is carried by the screen in the rotating carrier to a point above the carrier hub, where a shield member on the carrier hub normally covering the access port for the waste storage container has now rotated to a position to expose the access port and enable the agglomerated litter and fecal material to fall into the waste storage container.

The carrier may be rotated within the enclosure by mechanical (hand or foot actuation) or electrical means. For example, hand rotation may be accomplished by turning a hand crank or knob affixed to the outer surface of the housing. Alternatively, the enclosure may include a foot operated lever or a switch-activated electric motor connected to the carrier to rotate the carrier after use.

The cleaning cycle is accomplished by a 360 degree rotation of the carrier. During this cycle, the carrier rotates along with the contents through all or part of one revolution. The screen captures the agglomerated litter material and feces during the initial portion of the rotation and at approximately 180 degrees from the initial point, this captured material falls via gravity through the centrally located access port and into the waste storage container. As the carrier continues to rotate, the overlapping hemispheres in the carrier hub return to their opposing positions and in turn seal off the opening, and the apparatus is again ready for service as a litter box.

BRIEF DESCRIPTION OF THE DRAWINGS

FIG. 1 is a partially cutaway perspective view of a pet litter box and screening apparatus of this invention in its normal position, illustrating some of the component parts of the apparatus including an outer housing or enclosure portion having a large front opening, an inner carrier portion providing a litter accumulation area and including a radially-extending screen, rotationally mounted on a carrier support at a carrier hub and having an inclined axis of rotation, with a waste storage container positioned below the carrier hub;

FIG. 1A is a partially cutaway perspective view of the pet litter box and screening apparatus of FIG. 1 in its cleaning position with the carrier portion having been rotated about the carrier hub on its axis of rotation to move the screen through the litter accumulation area to collect any agglomerated litter and fecal material and carry it to a point above the carrier hub, where a shield member on the carrier hub normally covering an access port for the waste storage container is now rotated to a position to expose the access port and enable the agglomerated litter and fecal material to fall into the waste storage container;

FIG. 2 is a side elevation cross-sectional view of the pet litter box and screening apparatus of this invention in its normal position (as in FIG. 1), illustrating the carrier hub shield member normally covering the waste storage container access port, this view further illustrating a container pouring fresh litter material through a hatch in the enclosure and into a clean litter reservoir above the carrier and through to the litter accumulation area;

FIG. 3 is a side elevation cross-sectional view of the pet litter box of this invention again in its normal position (as in FIG. 1) and during use, with a cat comfortably seated within the enclosure and inside the carrier over the litter accumulation area, this view taken along line 3—3 of FIG. 1;

FIG. 4 is a side elevation cross-sectional view of the pet litter box of this invention in its cleaning position (as in FIG. 1A), this view taken along line 4—4 of FIG. 1A;

FIG. 5 is an enlarged side elevation cross-sectional view of the carrier hub in its normal position (as in FIG. 1), this view taken along line 5—5 of FIG. 3; and FIG. 6 is an enlarged side elevation cross-sectional view of the carrier hub in its cleaning position (as in FIG. 1A), this view taken along line 6—6 of FIG. 4.

DETAILED DESCRIPTION OF A PREFERRED EMBODIMENT

FIG. 1 is a partially cutaway perspective view of a pet litter box and screening apparatus 10 of this invention in its normal position, illustrating some of the component parts of the apparatus including an outer housing or enclosure portion 12 having a large front opening 14, an inner carrier portion 16 providing a litter accumulation area 18 for a quantity of litter 19 and including a radially-extending screen 20, rotationally mounted on a carrier support 22 at a carrier hub 24 and having an inclined axis of rotation 26, with a waste storage container 28 positioned below the carrier hub. The entire assembly may be made of plastic, metal, or other suitable material, preferably being both durable and easy to clean.

FIG. 1A is a partially cutaway perspective view of the pet litter box and screening apparatus 10 of FIG. 1 in its cleaning position with the carrier portion 16 having been rotated about the carrier hub 24 on its axis of rotation 26 to move the screen 20 through the litter accumulation area 18 to remove any agglomerated litter and fecal material 30 from the litter 19 and carry it to a point above the carrier hub 24, where a shield member 32 on the carrier hub 24 normally covering an access port 34 for the waste storage container 28 is now rotated to a position to expose the access port 34 and enable the agglomerated litter and fecal material 30 to fall into the waste storage container 28. The waste storage container preferably includes a door or other opening in the enclosure for easy access to remove the accumulated waste, and may include a bucket or tray for capture of the waste.

FIG. 2 is a side elevation cross-sectional view of the pet litter box and screening apparatus 10 of this invention in its normal position (as in FIG. 1), illustrating the carrier hub 24 shield member 32 normally covering the waste storage container 28 access port 34, this view further illustrating a container 36 pouring fresh litter material 19 through a hatch 38 in the enclosure 12 and into a clean litter reservoir 40 above the carrier 16 and through to the litter accumulation area 18.

Litter reservoir 40 includes an outlet 42, which may be gated or otherwise controlled to deliver a measured quantity of litter 19 to the litter accumulation area 18. Carrier support 22 is adapted to support the carrier 16 on it's inclined access 26, and enable rotation about this access without binding. Additional support for the carrier 16 may be provided by radially-disposed support bearings 44, if necessary.

FIG. 3 is a side elevation cross-sectional view of the pet litter box 10 of this invention again in its normal position (as in FIG. 1) and during use, with a cat C comfortably seated within the enclosure 12 and inside the carrier 16 over the litter accumulation area 18, this view taken along line 3—3 of FIG. 1. Front opening 14 in enclosure 12 is designed to be large enough to enable easy ingress and egress of a cat or other animal.

This view also illustrates optional features that may be incorporated into the inventive apparatus to control the initiation of the cleaning cycle. For example, a weight sensor 46 may be installed adjacent the front opening 14, so that the weight of the cat stepping on the weight sensor initiates rotation of the carrier 16 by a motor 48 after a predetermined delay (e.g., five minutes). Alternatively, a motion sensor 50 may be installed above the carrier 16 so that ingress/egress of the cat similarly initiates rotation of the carrier after a delay.

FIG. 4 is a side elevation cross-sectional view of the pet litter box 10 of this invention in its cleaning position (as in FIG. 1A), this view taken along line 4—4 of FIG. 1A. This view illustrates the screen 20, which extends radially from one side of shield 32 to the circumferential edge 52 of carrier 16, having passed through the litter accumulation area 18 to remove the agglomerated litter and fecal material 30, and leaving the essentially unsoiled litter material behind. The size of the openings 20A in screen 20 may be chosen to efficiently filter the agglomerated material from the litter accumulation area 18, without removing fresh litter.

FIG. 5 is an enlarged side elevation cross-sectional view of the carrier hub 24 in its normal position (as in FIG. 1), this view taken along line 5—5 of FIG. 3. This view illustrates the relationship between shield 32 and access port 34 in hub 24. In this normal (closed) position, shield 32 covers access port 34 to seal waste storage container 28 and prevent unwanted odors from entering the carrier, and thus the environs.

FIG. 6 is an enlarged side elevation cross-sectional view of the carrier hub 24 in its cleaning position (as in FIG. 1A), this view taken along line 6—6 of FIG. 4. In this cleaning (open) position, shield 32 has been moved by rotation of the carrier to expose access port 34, thus enabling agglomerated litter and fecal material to fall through the access port and into the waste storage container 28. After such disposal of the waste, the carrier is again rotated back to its original position, returning shield 32 to its normal (closed) position to cover the access port (as in FIG. 5).

While this invention has been described in connection with preferred embodiments thereof, it is obvious that modifications and changes therein may be made by those skilled in the art to which it pertains without departing from the spirit and scope of the invention. For example, the shape of the carrier may be conical, frusto-conical, spheroid, or other. Also, the axis of rotation of the carrier may vary from horizontal to vertical, though it is preferably inclined. Accordingly, the scope of this invention is to be limited only by the appended claims and their legal equivalents.

What is claimed as invention is:

1. A pet litter box and screening apparatus having litter screening and waste storage capabilities, said apparatus comprising:

an outer enclosure portion having an opening for ingress and egress by a cat or other animal;

an inner carrier portion rotationally mounted within said outer enclosure portion on a carrier support at a carrier hub, said carrier portion providing a litter accumulation area and including a radially-extending screen, said carrier hub including a shield member normally covering a port;

a waste storage container connected to said apparatus beneath said carrier hub port, wherein when said carrier portion is rotated about said carrier hub on its axis of rotation to move said screen through said litter accumulation area, agglomerated litter and fecal material is carried by said screen in the rotating carrier to a point above said carrier hub, and said shield member is rotated to a position to expose said port and enable the agglomerated litter and fecal material to fall into said waste storage container.

2. The pet litter box and screening apparatus of claim 1 wherein said enclosure includes a hatch enabling access to a clean litter reservoir above said carrier portion.

3. The pet litter box and screening apparatus of claim 1 wherein said enclosure includes radially-disposed support bearings for support of said carrier portion.

4. The pet litter box and screening apparatus of claim 1 wherein said screen extends radially from said shield member to an edge of said carrier portion.

5. The pet litter box and screening apparatus of claim 1 further including sensor means to detect use of said apparatus and intitiate rotation of said carrier portion.

\* \* \* \* \*